United States Patent
Lin et al.

(10) Patent No.: US 11,735,899 B1
(45) Date of Patent: Aug. 22, 2023

(54) RETRACTABLE DATA CABLE

(71) Applicant: Dongguan Ceesing Intelligent Device Manufacturing Co., Ltd, Dongguan (CN)

(72) Inventors: Zhanxing Lin, Dongguan (CN); Shengwei Zhang, Dongguan (CN); Min Ruan, Dongguan (CN); Longkou Chen, Dongguan (CN)

(73) Assignee: DONGGUAN CEESING INTELLIGENT DEVICE MANUFACTURING CO., LTD, Dongguan (CN)

( * ) Notice: Subject to any disclaimer, the term of this patent is extended or adjusted under 35 U.S.C. 154(b) by 0 days.

(21) Appl. No.: 18/048,421

(22) Filed: Oct. 20, 2022

(30) Foreign Application Priority Data

Mar. 17, 2022 (CN) .......................... 202220589130.3
May 17, 2022 (CN) .......................... 202221184784.4

(51) Int. Cl.
*H02G 11/02* (2006.01)
(52) U.S. Cl.
CPC .................................... *H02G 11/02* (2013.01)
(58) Field of Classification Search
CPC ............ H02G 11/02; B65H 2701/3919; B65H 75/4471; B65H 2701/34
See application file for complete search history.

(56) References Cited

U.S. PATENT DOCUMENTS

| | | | | |
|---|---|---|---|---|
| 6,019,198 A * | 2/2000 | Nielsen | ............... | B65H 75/4434 188/31 |
| 7,201,342 B2 * | 4/2007 | Huang | ............... | B65H 75/4431 242/378.2 |
| 10,087,040 B2 * | 10/2018 | Morey | ............... | B65H 75/4434 |
| 11,177,641 B1 * | 11/2021 | Ebrahimi Afrouzi | ......... | H02J 7/0042 |
| 2010/0084236 A1 * | 4/2010 | Yang | ....................... | H01R 13/72 439/501 |
| 2021/0021116 A1 * | 1/2021 | Johnson | .................. | H02G 11/02 |

FOREIGN PATENT DOCUMENTS

CN              215732537 U      2/2022

* cited by examiner

*Primary Examiner* — Mark T Le
(74) *Attorney, Agent, or Firm* — Andrew C. Cheng (57) ABSTRACT

A retractable data cable assembly is provided, which includes a cable, a winding assembly, a movable assembly and a housing defining an accommodating cavity where the winding assembly and the movable assembly are arranged. The cable is wound around the winding assembly and exposed out of the housing. The winding assembly includes a winder rotatable with respect to the housing. The movable assembly is disposed on a side of the winder and positioned to connect to the housing. The movable assembly includes a transmission assembly and an auxiliary member respectively coupled with the winder and the transmission assembly. The auxiliary member produces elastic deformation to provide the transmission assembly with a preload force for swinging toward or away from the side of the auxiliary member. The storage of the retractable data cable assembly is more convenient.

19 Claims, 8 Drawing Sheets

RETRACTABLE DATA CABLE

TECHNICAL FIELD OF THE INVENTION

The present disclosure relates to the technical field of data cables, more particularly to a retractable data cable.

BACKGROUND OF THE INVENTION

At present, there are a small number of charging cables on the market that can be telescopically adjusted. However, the adjustment structure of the traditional telescopically adjustable charger is too complicated, which is inconvenient for production, installation and use.

SUMMARY OF THE INVENTION

To solve the problem that the adjustment structure of the traditional telescopically adjustable charger is too complicated, the present disclosure provides a retractable data cable.

To solve the above technical problems, the present disclosure provides a retractable data cable that includes a hollow housing, a cable, a winding assembly and a movable assembly. The housing defines an accommodating cavity, and the winding assembly and the movable assembly are arranged therein. The cable is wound around the winding assembly and exposed out of the housing. The winding assembly includes a winder, which is rotatable with respect to the housing. The movable assembly is disposed on a side of the winder and is relatively fixed to the housing. The movable assembly includes a transmission assembly coupled with the housing and the winder and an auxiliary member fixedly connected to the housing. The auxiliary member is disposed on one side of the transmission assembly and coupled with the transmission assembly. The winder rotates to drive the transmission assembly to move and then drive the auxiliary member to produce elastic deformation, so as to provide the transmission assembly with a preload force for swinging toward or away from the side of the auxiliary member.

Preferably, the transmission assembly includes a moving gear, a position-limiting gear and a swing reset member. The moving gear is fixedly connected to the winder, and the swing reset member is positioned between the moving gear, the position-limiting gear and the auxiliary member. The swing reset member includes a first cooperating unit coupled with the position-limiting gear, a second cooperating unit coupled with the moving gear, and a third cooperating unit coupled with the auxiliary member. The auxiliary member is coupled with the third cooperating unit to provide a preload force for the swing reset member to swing toward or away from the side of the auxiliary member.

Preferably, the auxiliary member is a strip-shaped reset member that can perform elastic deformation. One end of the strip-shaped reset member is fixedly connected to the housing, and the other end thereof is coupled with the third cooperating unit.

Preferably, one end of the strip-shaped reset member defines at least two slots or holes separately, and the housing is provided with a corresponding number of position-limiting shafts at corresponding positions. The position-limiting shafts are coupled with the slots or holes on the strip-shaped reset member to limit the position of the strip-shaped reset member.

Preferably, the first cooperating unit includes a pushing portion and a locking portion, which are respectively arranged at two ends of the swing reset member and coupled with the position-limiting gear.

Preferably, the winding assembly further includes a coil spring disposed on the side of the winder away from the movable assembly and fixedly connected to the winder.

Preferably, the winding assembly further includes a coil-spring fixing member. One end of the coil-spring fixing member is relatively fixed to the end of the winder close to the coil spring, and the other end thereof is clamped with one end of the coil spring.

Preferably, the moving gear includes at least three tooth slots, and the second cooperating unit is a protrusion matched with the tooth slots.

Preferably, an annular isolation wall is further provided on the side of the winder close to the movable assembly. The annular isolation wall and the housing define an isolation cavity, and the movable assembly is disposed therein.

Preferably, a central shaft is provided on the housing, the moving gear and the winder are sleeved on the central shaft, and the strip-shaped reset member is arranged around the central shaft.

Preferably, the transmission assembly includes a swing member and a shift-position gear. The shift-position gear is fixedly connected to the winder, and one end of the swing member is rotatably connected to the housing. The swing member is disposed between the shift-position gear and the auxiliary member. The other end of the swing member is provided with a fourth cooperating unit coupled with the shift-position gear, and the swing member further includes a fifth cooperating unit coupled with the auxiliary member to provide the swing member with a preload force for swinging toward or away from the side of the auxiliary member.

Preferably, the shift-position gear includes a neutral-position tooth slot and a position-limiting tooth slot, and the fourth cooperating unit is coupled with the neutral-position tooth slot and the position-limiting tooth slot to realize the retraction and locking of the cable.

Preferably, a locking tooth slot and a reset tooth slot are alternately arranged on the position-limiting gear. The first cooperating unit includes a pushing portion and a locking portion, which are respectively arranged on two ends of the swing reset member and coupled with the locking tooth slot and the reset tooth slot of the position-limiting gear.

Preferably, the third cooperating unit is a groove, and the depth of the groove can ensure that the strip-shaped reset member does not slip out of the groove when the swing reset member swings.

Preferably, a first positioning shaft and a second positioning shaft are arranged in the housing, the position-limiting gear is rotatably connected to the housing through the first positioning shaft, and the swing reset member is rotatably connected to the housing through the second positioning shaft.

Preferably, the strip-shaped reset member is configured in an arc shape.

Preferably, the cable includes an input connector and an output connector, and the number of the input connector and the output connector can be one, two or three.

Preferably, the fourth cooperating unit is a tooth-shaped protrusion disposed on the other end of the swing member.

Preferably, the number of the neutral-position tooth slots is 1 to 4, and the number of the position-limiting tooth slots is 4 to 8.

Preferably, the neutral-position tooth slot and the position-limiting tooth slot are symmetrically arranged on the shift-position gear.

Compared with the prior art, the unidirectional free-pulling data cable of the present disclosure has the following beneficial effects.

The present disclosure provides a retractable data cable, which includes a hollow housing, a cable, a winding assembly and a movable assembly. The housing defines an accommodating cavity, and the winding assembly and the movable assembly are arranged therein. The cable is wound around the winding assembly and exposed out of the housing. The winding assembly includes a winder, which is rotatable with respect to the housing. The movable assembly is disposed on a side of the winder and relatively fixed to the housing. The movable assembly includes a transmission assembly coupled with the housing and the winder and an auxiliary member fixedly connected to the housing. The transmission assembly is coupled with the winder, and the auxiliary member is disposed on one side of the transmission assembly and coupled with the transmission assembly. The winder rotates to drive the transmission assembly to move and then drive the auxiliary member to produce elastic deformation, so as to provide the transmission assembly with a preload force for swinging toward or away from the side of the auxiliary member. By arranging the winder, the cable wound on the winder can be freely stretched or retracted. In the retractable data cable, the winder is coupled with the movable assembly, so that the movable assembly can position the cable no matter how long the cable wound on the winder is stretched. When using, pull the cable to drive the winder to rotate, so that the cable can be pulled out from the winder. When pulling out a suitable length to use, the cable can be released directly, and the winder is coupled with the transmission assembly and the auxiliary member of the movable assembly to keep the cable at this length for use. It can be seen that the movable assembly is coupled with the winder, so that the adjusting structure of the retractable data cable is simplified, and the practicability thereof is effectively improved.

The transmission assembly of the retractable data cable of the present disclosure includes a moving gear, a position-limiting gear and a swing reset member. The moving gear is fixedly connected to the winder, and the swing reset member is positioned between the moving gear, the position-limiting gear and the auxiliary member. The swing reset member includes a first cooperating unit coupled with the position-limiting gear, a second cooperating unit cooperating with the moving gear, and a third cooperating unit cooperating with the auxiliary member. The auxiliary member is coupled with the third cooperating unit to provide a preload force for the swing reset member to swing toward or away from the side of the auxiliary member. Through the elastic deformation of the auxiliary member, the third cooperating unit applies a preload force to the swing reset member, so that the swing reset member has a tendency to swing to one side. When the cable is pulled to drive the winder and the moving gear to rotate, the moving gear will drive the swing reset member to move through the second cooperating unit, so that the swing reset member drives the position-limiting gear to rotate through the first cooperating unit. However, due to the existence of the preload force, the swing reset member will rebound when moving to a certain distance to be in contact and coupled with the tooth slot of the position-limiting gear again. The swing reset member is coupled with different tooth slots of the position-limiting gear, so that the function of locking and retraction can be realized. It can be seen that, by providing the preload force provided by the auxiliary member to make the swing reset member rebound, the structure of the retractable data cable is simpler.

The auxiliary member of the retractable data cable of the present disclosure is a strip-shaped reset member that can perform elastic deformation. One end of the strip-shaped reset member is a fixed end fixedly connected to the housing, and the other end thereof is a free end coupled with the third cooperating unit. By being relatively fixed to the housing, it can be ensured that the strip-shaped reset member as a whole will remain relatively static during use, and a stable preload force is provided to the swing reset member. In addition, when the auxiliary member is configured as a strip-shaped reset member, the auxiliary member and the transmission assembly are arranged separately, so that when breaking down, it is easier to replace the damaged component.

In the retractable data cable of the present disclosure, one end of the strip-shaped reset member defines at least two slots or holes separately, and the housing is provided with a corresponding number of position-limiting shafts at corresponding positions. The position-limiting shafts are coupled with the slots or holes on the strip-shaped reset member to limit the position of the strip-shaped reset member. The at least two shafts are coupled with the holes to position the strip-shaped reset member, so that the strip-shaped reset member can be coupled with the swing reset member more stably, the structure is simple, the installation is convenient, and the realization is easy.

In the retractable data cable of the present disclosure, the first cooperating unit includes a pushing portion and a locking portion, which are respectively arranged at two ends of the swing reset member and coupled with the position-limiting gear. Thus, the swing reset member can drive the position-limiting gear and couple with the limit gear during the swing, so as to realize the locking of the position-limiting gear to the swing reset member in different states, which is simple in structure, small in size, and makes the data cable lighter.

In the retractable data cable of the present disclosure, the winding assembly further includes a coil spring disposed on the side of the winder away from the movable assembly and fixedly connected to the winder. The coil spring can store elastic potential energy when the cable is stretched, and the cable can be retracted via the stored elastic potential energy when not in use, which improves the retractable function of the data cable.

In the retractable data cable of the present disclosure, the winding assembly further includes a coil-spring fixing member. One end of the coil-spring fixing member is relatively fixed to the end of the winder close to the coil spring, and the other end thereof is clamped with one end of the coil spring. By disposing the coil-spring fixing member, the fixed connection between the coil spring and the winder is realized, which makes the installation more convenient and the structure more reasonable.

In the retractable data cable of the present disclosure, the moving gear includes at least three tooth slots, and the second cooperating unit is a protrusion matched with the tooth slots. By matching the tooth slots with the protrusion, the moving gear can drive the swing reset member to swing, and the swing reset member can slide out from the tooth slot when moving for a certain distance. The swing reset member can rebound via the preload force and at least three tooth slots can ensure that when the moving gear rotates, the swing reset member will not be in a static state for a long time without matching with the tooth slots, which prevents the situation that the cable cannot be locked timely. It can be seen that, by matching the protrusion with the tooth slots, the structure of the retractable data cable is more reasonable, and the use is smoother.

In the retractable data cable of the present disclosure, an annular isolation wall is further provided on the side of the winder close to the movable assembly. The annular isolation wall and the housing define an isolation cavity, and the movable assembly is disposed therein. The movable assembly is isolated by the isolation cavity, which protects the movable assembly and prolongs the lifetime of the retractable data cable.

NUMERICAL REFERENCE IDENTIFICATION 1. retractable data cable;
10. housing; 11. cable; 12. winding assembly; 13. movable assembly;
100. first positioning shaft; 101. second positioning shaft; 102. central shaft; 103. positioning shaft; 120. winder; 121. coil spring; 122. coil-spring fixing member; 130. transmission assembly; 131. auxiliary member;
1200. annular isolation wall; 1300. swing reset member; 1301. position-limiting gear; 1302. moving gear; 1303. shift-position gear; 1304. swing member; 1310. strip-shaped reset member;
13000. first cooperating unit; 13001. second cooperating unit; 13002. third cooperating unit; 13010. locking tooth slot; 13011. reset tooth slot; 13030. neutral-position tooth slot; 13040. fourth cooperating unit; 13041. fifth cooperating unit; 13042. tooth-shaped protrusion; 13100. slot or hole;
130000. pushing portion; 130001. locking portion.

DETAILED DESCRIPTION OF THE INVENTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the disclosure.

It should be noted that the terms "first" and "second" in the specification and claims of the present disclosure are used to distinguish different objects, rather than to describe a specific order.

It should be noted that, when an element is referred to as being "fixed to" another element, it can be directly on the other element or intervening elements may also exist. When an element is referred to as being "connected" to another element, it can be directly connected to the other element or intervening elements may also exist. The terms "vertical", "horizontal", "left", "right" and similar expressions are used herein for illustrative purposes only.

It should be noted that, in the present disclosure, the terms "up", "down", "left", "right", "front", "rear", "top", "bottom", "inside", "outside", "middle", "vertical", "horizontal", "longitudinal", etc. are based on the orientations or positional relationships shown in the drawings. Terms herein are primarily used to better describe the disclosure and the embodiments, and are not intended to limit that the indicated device, element, or component must have a particular orientation, or be constructed and operated in a particular orientation.

In addition, some of the above-mentioned terms may be used to express other meanings besides orientation or positional relationship. For example, the term "on" may also be used to express a certain attachment or connection relationship in some cases. For those skilled in the art, the specific meanings of the above terms in the present disclosure can be understood according to specific situations.

Furthermore, the terms "install", "arrange", "provide", "connect", "contact" should be construed broadly. For example, it may be a fixed connection, a detachable connection, or an integral structure; it may be a mechanical connection, or an electrical connection; it may be directly connected, or indirectly connected through an intermediary, or an internal communication between two devices, elements, or components. For those skilled in the art, the specific meanings of the above terms in the present disclosure can be understood according to specific situations.

Figure 1:
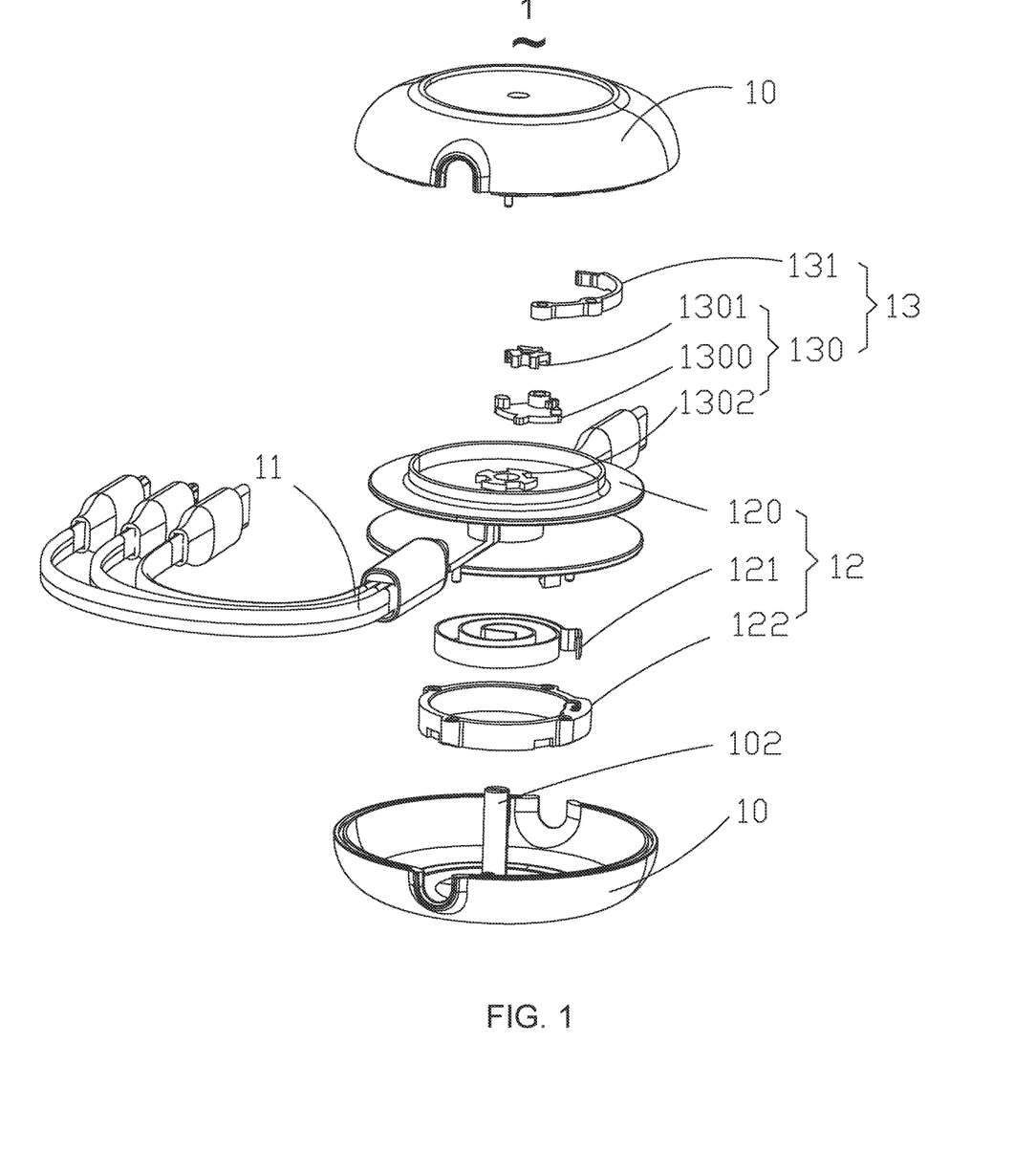
FIG. 1 is a first exploded view of a retractable data cable according to a first embodiment of the present disclosure.

Referring to FIG. 1, a first embodiment of the present disclosure provides a retractable data cable 1, which includes a hollow housing 10, a cable 11, a winding assembly 12 and a movable assembly 13. The housing 10 defines an accommodating cavity, and the winding assembly 12 and the movable assembly 13 are arranged therein. The cable 11 is wound around the winding assembly 12 and exposed out of the housing 10. The winding assembly 12 includes a winder 120, which is rotatable with respect to the housing 10. The movable assembly 13 is disposed on a side of the winder 120 and relatively fixed to the housing 10. It can be understood that the relatively fixed connection of the movable assembly 13 to the housing 10 means that relative positioning between the movable assembly 13 and the housing 10 is realized by connecting the movable assembly 13 to the housing 10, however, the movement of the movable assembly 13 in the relatively positioned position is not limited. The movable assembly 13 includes a transmission assembly 130 coupled with the housing 10 and the winder 120 and an auxiliary member 131 fixedly connected to the housing 10. The transmission assembly 130 is coupled with the winder 120, and the movable assembly 13 can move with the rotation of the winder 120. The auxiliary member 131 is disposed on one side of the transmission assembly 130 and coupled with the transmission assembly 130 to produce elastic deformation with the movement of the transmission assembly 130. The rotation of the winder 120 can drive the transmission assembly 130 to move and then drive the auxiliary member 131 to produce elastic deformation, so as to provide the transmission assembly 130 with a preload force for swinging toward or away from the side of the auxiliary member 131. By arranging the winder 120, the cable 11 wound on the winder 120 can be freely stretched or retracted. In the retractable data cable 1, the winder 120 is coupled with the movable assembly 13, so that the movable assembly 13 can position the cable 11 no matter how long the cable 11 wound on the winder 120 is stretched. When using, pull the cable 11 to drive the winder 120 to rotate, so that the cable 11 can be pulled out from the winder 120. When pulling out a suitable length to use, the cable 11 can be released directly, and the winder 120 is coupled with the transmission assembly 130 and the auxiliary member 131 of the movable assembly 13 to keep the cable 11 at this length for use. It can be seen that the movable assembly 13 is coupled with the winder 120, so that the adjusting structure of the retractable data cable 1 is simplified, and the practicability thereof is effectively improved.

In some embodiments, the winding assembly 12 further includes a coil spring 121 disposed on the side of the winder 120 away from the movable assembly 13 and fixedly connected to the winder 120. The coil spring 121 can store elastic potential energy when the cable 11 is stretched, and the cable 11 can be retracted via the stored elastic potential energy when not in use, which improves the retractable function of the data cable.

Figure 2:
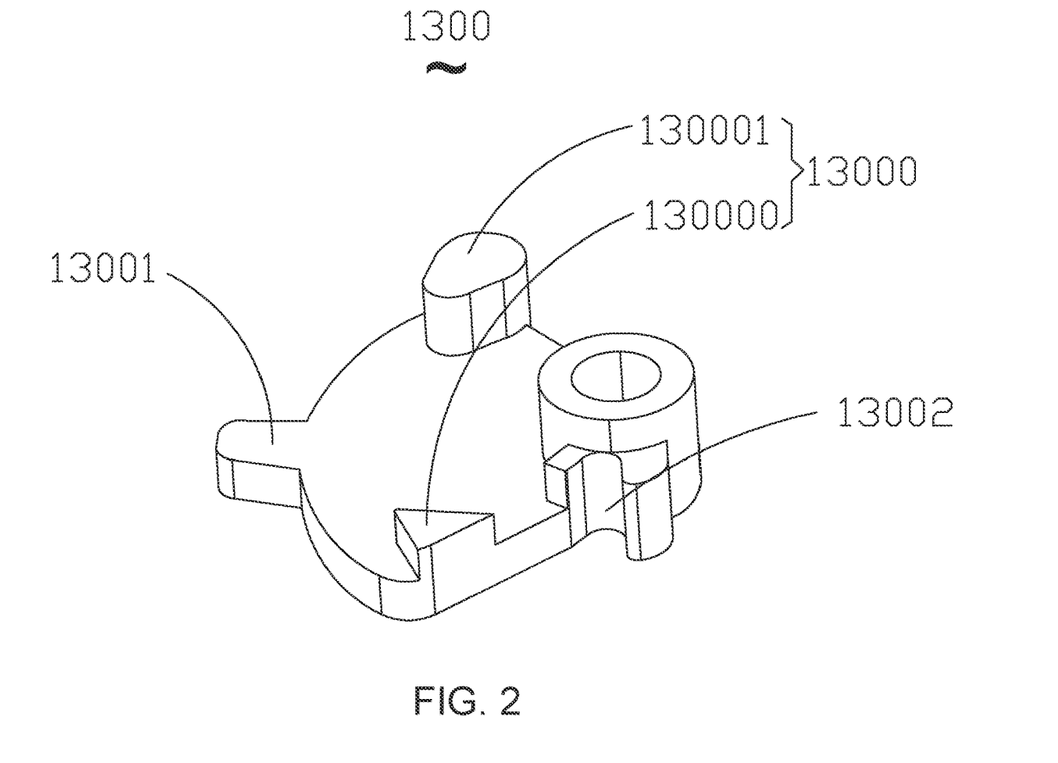
FIG. 2 is a schematic diagram of a swing reset member of the retractable data cable according to the first embodiment of the present disclosure.

Referring to FIG. 1 and FIG. 2, in some embodiments, the transmission assembly 130 includes a moving gear 1302, a position-limiting gear 1301 and a swing reset member 1300. The moving gear 1302 is fixedly connected to the winder 120, and the swing reset member 1300 is positioned between the moving gear 1302, the position-limiting gear 1301 and the auxiliary member 131. The swing reset member 1300 includes a first cooperating unit 13000 coupled with the position-limiting gear 1301, a second cooperating unit 13001 coupled with the moving gear 1302, and a third cooperating unit 13002 coupled with the auxiliary member 131. The auxiliary member 131 is coupled with the third cooperating unit 13002 to provide a preload force for the swing reset member 1300 to swing toward or away from the side of the auxiliary member 131.

Figure 3:
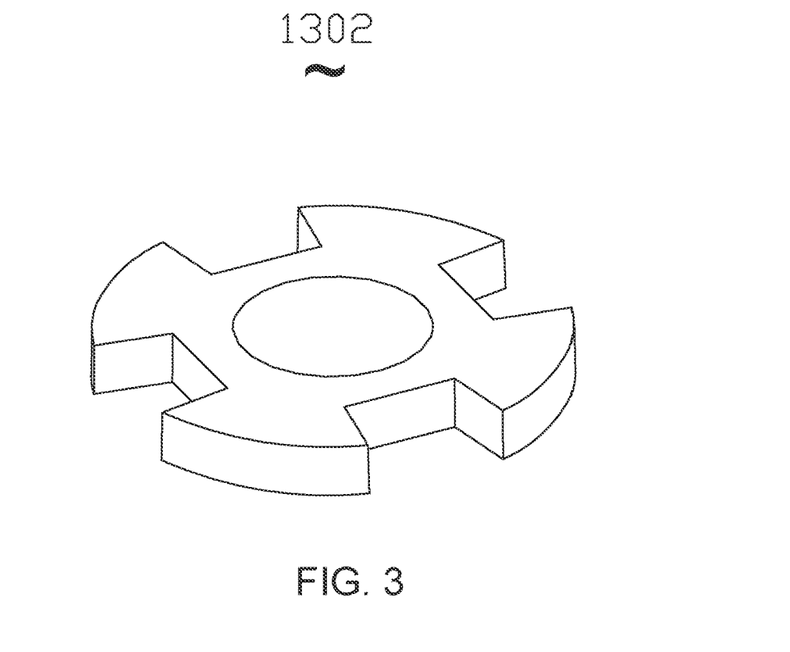
FIG. 3 is a schematic diagram of a moving gear of the retractable data cable according to the first embodiment of the present disclosure.
Figure 4:
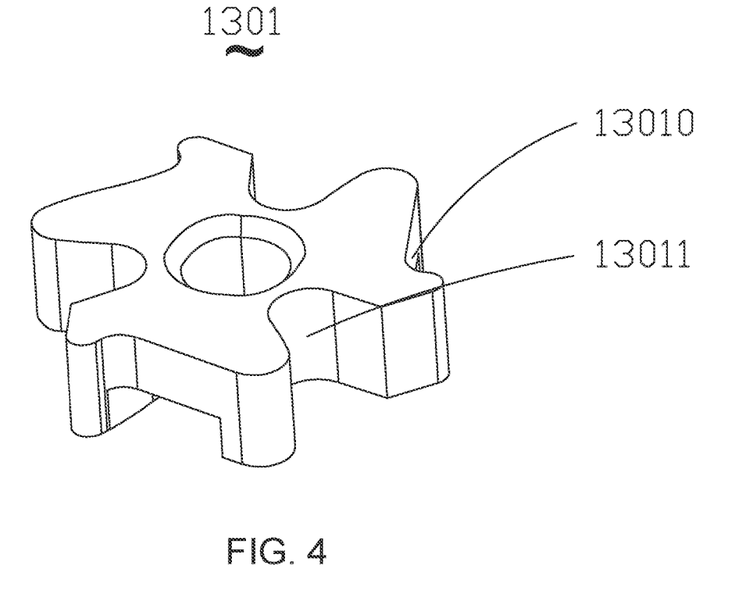
FIG. 4 is a schematic diagram of a position-limiting gear of the retractable data cable according to the first embodiment of the present disclosure.

Referring to FIG. 1 to FIG. 3, in some embodiments, the moving gear 1302 includes at least three tooth slots, and the second cooperating unit 13001 is a protrusion matched with the tooth slots. By matching the tooth slots with the protrusion, the moving gear 1302 can drive the swing reset member 1300 to swing, and the swing reset member 1300 can slide out from the tooth slot when moving for a certain distance. The swing reset member 1300 can rebound via the preload force to couple with the next tooth slot. By arranging at least three tooth slots, it can be ensured that when the moving gear 1302 rotates, the swing reset member 1300 will not be in a state of not being matched with the tooth slots for a long time, which prevents the situation that the cable 11 cannot be locked timely. It can be seen that, by matching the protrusion with the tooth slots, the structure of the retractable data cable 1 is more reasonable, and the use is smoother.

Referring to FIG. 1 to FIG. 4, in some embodiments, the position-limiting gear 1301 defines a locking tooth slot 13010 and a reset tooth slot 13011 arranged alternately. The first cooperating unit 13000 includes a pushing portion 130000 and a locking portion 130001, which are respectively arranged at two ends of the swing reset member 1300 to couple with the locking tooth slot 13010 and the reset tooth slot 13011 of the position-limiting gear 1301.

Referring to FIG. 1 to FIG. 5, when the cable 11 is stretched, the moving gear 1302 drives the swing reset member 1300 to swing through the second cooperating unit 13001, so that the pushing portion 130000 is in contact with the position-limiting gear 1301 and pushes the position-limiting gear 1301 to rotate. When the stretching stops, due to the elastic force of the coil spring 121, the winder 120 will rotate back for a short distance, and the rotation of the winder 120 and the preload force provided by the auxiliary member 131 will drive the swing reset member 1300 to swing back for a certain distance. At this time, the locking portion 130001 of the swing reset member 1300 is matched with the locking tooth slot 13010 of the position-limiting gear 1301 to fix the swing reset member 1300 to the current position, so that the moving gear 1302 coupled with the second cooperating unit 13001 is fixed to the current position, which further realizes the fixing of the winder 120 and the cable 11. When the cable 11 needs to be retracted, the cable 11 is stretched by a suitable distance, and the moving gear 1302 drives the swing reset member 1300 to swing a certain distance, so that the pushing portion 130000 pushes the position-limiting gear 1301 to rotate, and the reset tooth slot 13011 is rotated to the preset position. When releasing hands, due to the rotation of the moving gear 1302 and the preload force, the swing reset member 1300 swings back, and the locking portion 130001 is matched with the reset tooth slot 13011. At this time, the second cooperating unit 13001 is no longer matched with the tooth slot of the moving gear 1302, and the moving gear 1302 drives the winder 120 to rotate back to complete the retraction of the cable 11.

Figure 5:
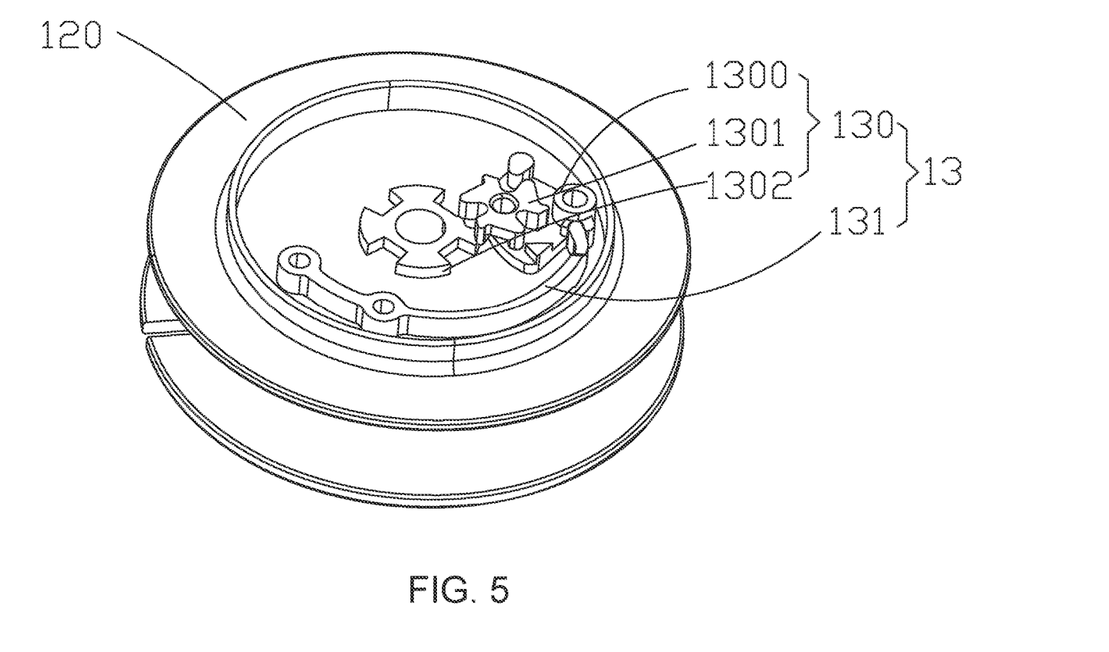
FIG. 5 is a schematic diagram of a movable assembly coupled with a winding assembly of the retractable data cable according to the first embodiment of the present disclosure.
Figure 6:
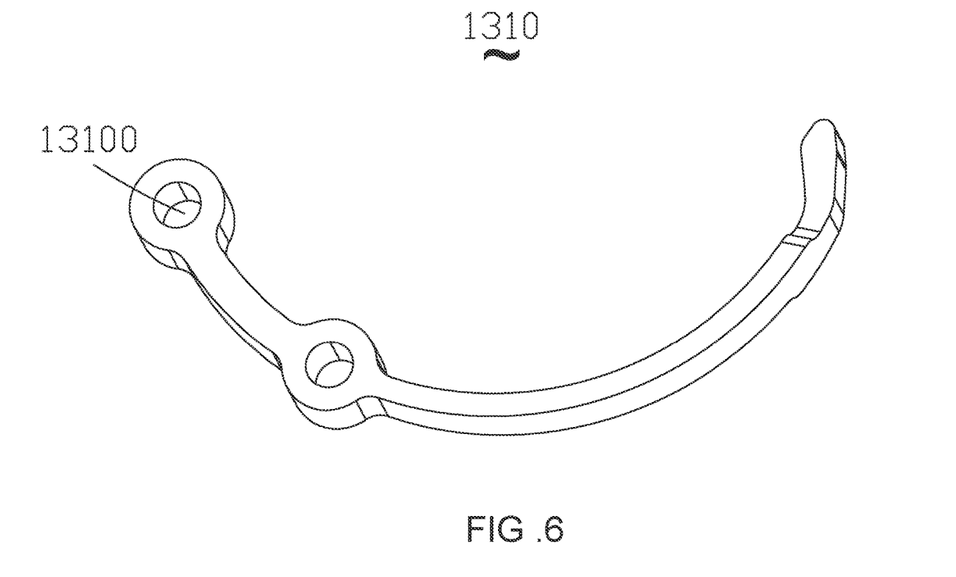
FIG. 6 is a schematic diagram of a strip-shaped reset member of the retractable data cable according to the first embodiment of the present disclosure.

Referring to FIG. 5 and FIG. 6, in some embodiments, the auxiliary member 131 is a strip-shaped reset member 1310 that can perform elastic deformation. One end of the strip-shaped reset member 1310 is a fixed end fixedly connected to the housing 10, and the other end thereof is a free end coupled with the swing reset member 1300. By being fixedly connected to the housing 10, it can be ensured that the strip-shaped reset member 1310 as a whole will remain relatively static during use, and the free end can move within a certain range to provide a stable preload force to the swing reset member 1300. In addition, when the auxiliary member 131 is configured as a strip-shaped reset member 1310, the auxiliary member 131 and the transmission assembly 130 are arranged separately, so that when breaking down, it is easier to replace the damaged component.

It can be understood that the amount of the preload force is determined by the length of the free end, so the length of the fixed end and the free end can be adjusted to adjust the amount of the preload force.

Referring to FIG. 1 and FIG. 6, in some embodiments, one end of the strip-shaped reset member 1310 defines at least two slots or holes separately, and the housing 10 is provided with a corresponding number of position-limiting shafts at corresponding positions. The position-limiting shafts are coupled with the slots or holes on the strip-shaped reset member 1310 to limit the position of the strip-shaped reset member 1310. The at least two shafts are coupled with the holes to position the strip-shaped reset member 1310, so that the strip-shaped reset member 1310 can be coupled with the swing reset member 1300 more stably, the structure is simple, the installation is convenient, and the realization is easy.

As a variant, the fixed connection between the strip-shaped reset member 1310 and the housing 10 can also be realized in the following manner. One end of the strip-shaped reset member 1310 defines at least two threaded holes separately, and corresponding positions of the housing 10 are provided with a corresponding number of through-holes. The strip-shaped reset member 1310 is threadedly connected to the housing 10, so that the structure of the threaded connection is more stable and simple, and it is easy to install.

Figure 7:
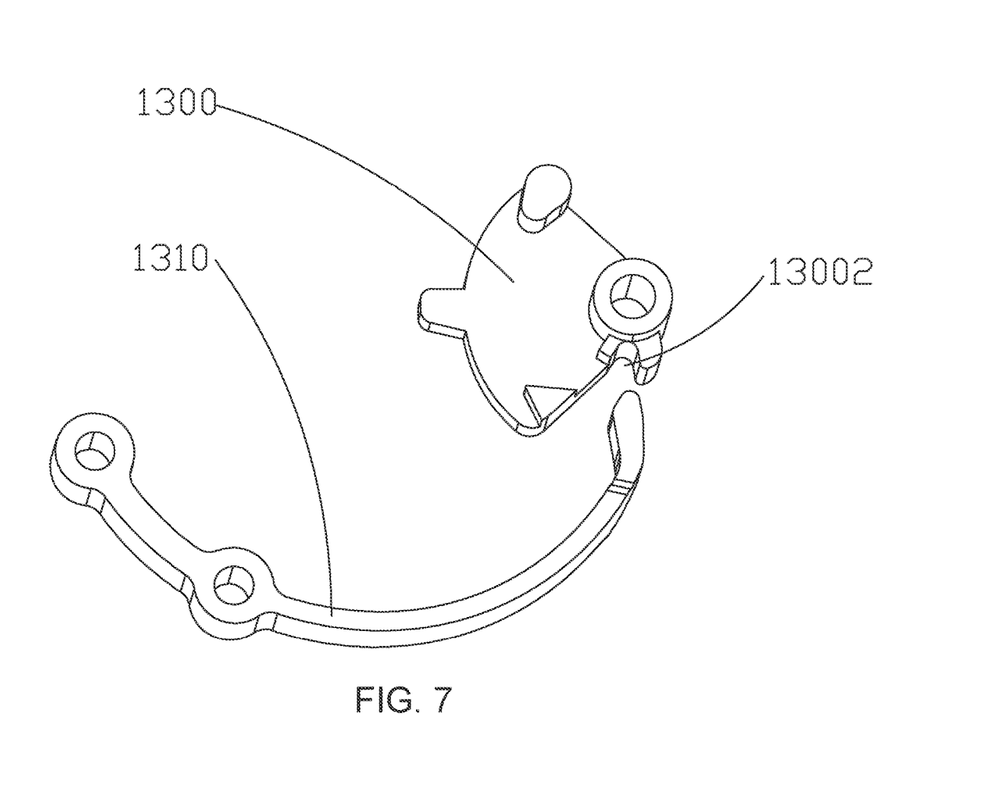
FIG. 7 is a schematic diagram of the strip-shaped reset member coupled with the swing reset member of the retractable data cable according to the first embodiment of the present disclosure.

Referring to FIG. 7, in some embodiments, the third cooperating unit 13002 is a groove with a certain depth to ensure that the strip-shaped reset member 1310 does not slip out of the groove when the swing reset member 1300 swings. When swinging, the groove and the strip-shaped reset member 1310 move with respect to each other, so that the strip reset member 1310 is deformed and one end thereof does not slip out of the groove to provide a stable preload force.

Figure 8:
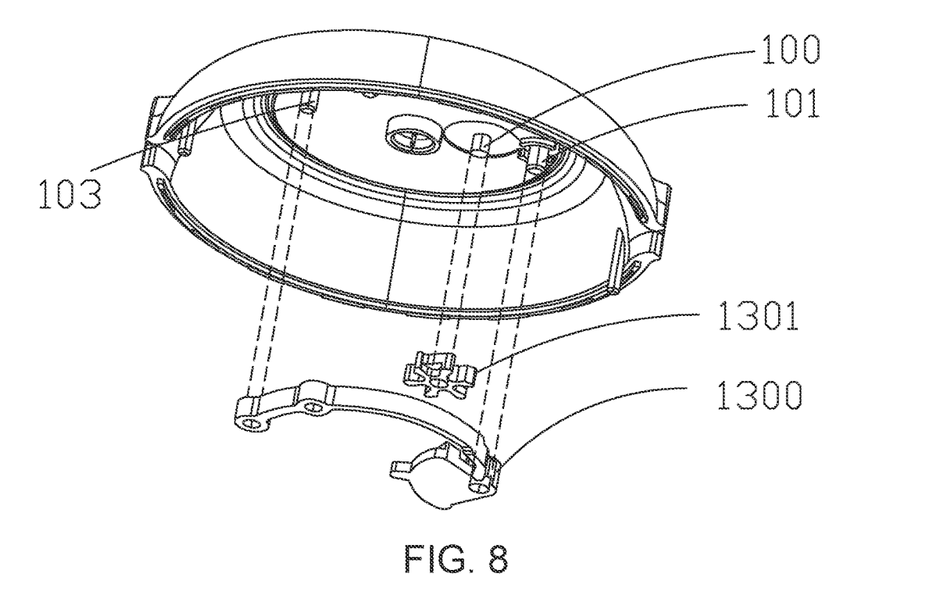
FIG. 8 is a schematic diagram of a transmission assembly coupled with a housing of the retractable data cable according to the first embodiment of the present disclosure.

Referring to FIG. 8, in some embodiments, the housing 10 is provided with a first positioning shaft 100 and a second positioning shaft 101, the position-limiting gear 1301 and the swing reset member 1300 are respectively rotatably connected to the housing 10 through the first positioning shaft 100 and the second positioning shaft 101.

Figure 9:
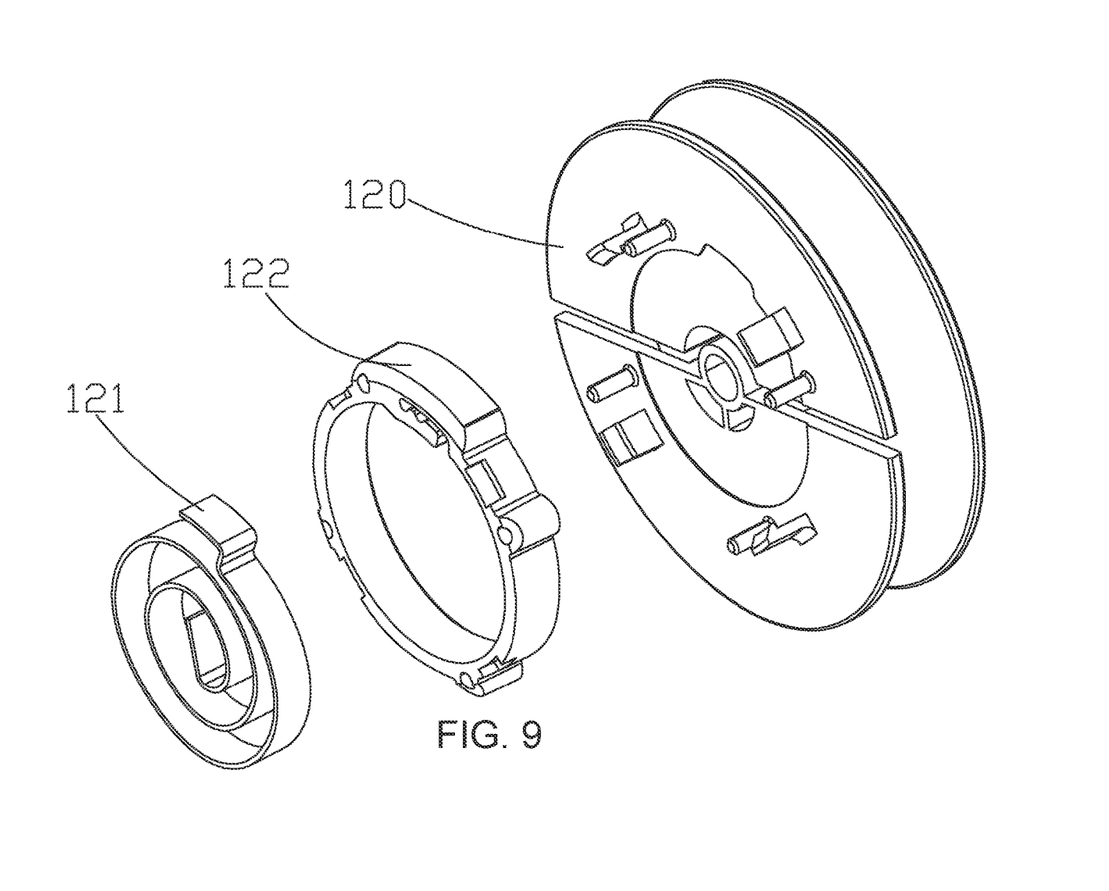
FIG. 9 is a schematic diagram of a coil-spring fixing member of the retractable data cable according to the first embodiment of the present disclosure.

Referring to FIG. 9 again, in some embodiments, the winding assembly 12 further includes a coil-spring fixing member 122. One end of the coil-spring fixing member 122 is relatively fixed to the end of the winder 120 close to the coil spring 121, and the other end thereof is clamped with one end of the coil spring 121. By disposing the coil-spring fixing member 122, the fixed connection between the coil spring 121 and the winder 120 is realized, which makes the installation more convenient and the structure more reasonable.

Figure 10:
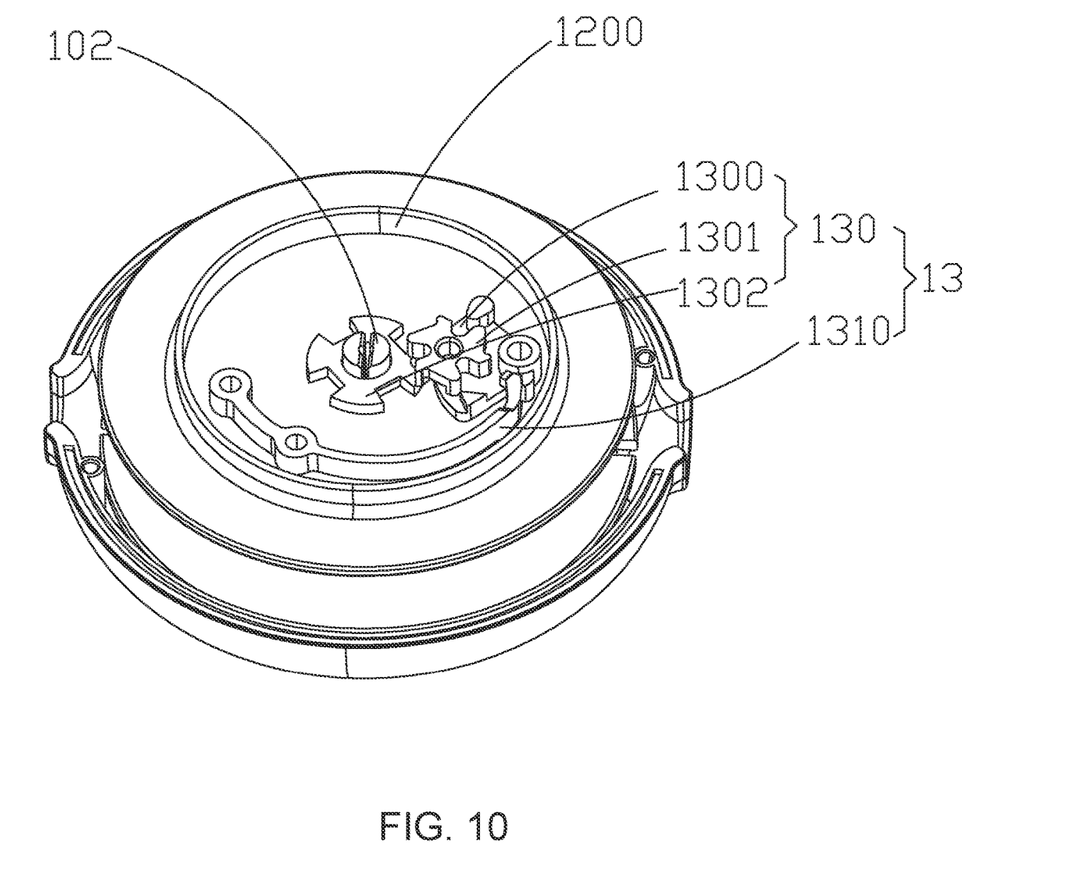
FIG. 10 is a first schematic diagram of the position distribution of components on the winder of the retractable data cable according to the first embodiment of the present disclosure.

Referring to FIG. 1 and FIG. 10, in some embodiments, an annular isolation wall 1200 is further provided on the side of the winder 120 close to the movable assembly 13. The annular isolation wall 1200 and the housing 10 define an isolation cavity, and the movable assembly 13 is disposed therein. The movable assembly 13 is isolated by the isolation cavity, which protects the movable assembly 13 and prolongs the lifetime of the retractable data cable 1.

Referring to FIG. 10 again, in some embodiments, the strip-shaped reset member 1310 is configured in an arc shape and is disposed around the central shaft 102, which can make the preload force generated by the deformation of the strip-shaped reset member 1310 more reasonably fed back to the swing reset member 1300, and can make that the strip-shaped reset member 1310 and the swing reset member 1300 are not easily separated from each other during relative movement.

Further, the cable 11 further includes an input connector and an output connector.

Optionally, the number of the input connectors and the output connectors of the cable 11 may be one, two or three. Specifically, in the embodiment of the present disclosure, the cable 11 has one input connector and three output connectors, which can be a USB connector, a Type-C connector, a Micro connector or a Lightning connector.

For example, the initial state of the retractable data cable 1 is a retracted state. When using the data cable, stretch the cable 11 to drive the winder 120 to rotate. The coil spring fixing member 122 fixedly connected to the winder 120 synchronously rotates along with the winder 120, and the elastic force of the coil spring 121 increases; the moving gear 1302 fixedly connected to the winder 120 synchronously rotates with the winder 120, and drives the swing reset member 1300 coupled with the moving gear 1302 to rotate to one side. When the swing reset member 1300 rotates, the pushing portion 130000 will push the position-limiting gear 1301 to rotate to push the locking tooth slot 13010 to the preset position. When the swing reset member 1300 swings to a certain distance, the second cooperating unit 13001 of the swing reset member 1300 slides out from the tooth slot of the moving gear 1302. At this time, the strip-shaped reset member 1310 coupled with the swing reset member 1300 has undergone elastic deformation, which provides a preload force for the swing reset member 1300, so that the swing reset member 1300 rebounds in the other direction, and is matched with the next tooth slot of the moving gear 1302. When pulled to a suitable length and released, the elastic force of the coil spring 121 will make the winder 120 rotate back and drive the moving gear 1302 to rotate back. Due to the rotation of the moving gear 1302 and the preload force, the locking portion 130001 of the swing reset member 1300 is coupled with the locking tooth slot 13010 of the position-limiting gear 1301 to fix the swing reset member 1300 to the current position, namely, the second cooperating unit 13001 of the swing reset member 1300 is coupled with the moving gear 1302 to fix the swing reset member 1300 to the current position, thereby realizing the locking of the winder 120 and the cable 11.

When retracted, the cable 11 is stretched a short distance to make the moving gear 1302 drive the swing reset member 1300 to swing a short distance, so that the pushing portion 130000 pushes the position-limiting gear 1301 to push the reset tooth slot 13011 to the preset position. When releasing hands, the swing reset member 1300 swings back, so that the locking portion 130001 is matched with the reset tooth slot 13011 to fix the swing reset member 1300 to the current position. At this time, the second cooperating unit 13001 of the swing reset member 1300 is no longer coupled with the moving gear 1302, the rotation of the moving gear 1302 is not hindered, and the elastic force of the coil spring 121 makes the winder 120 rotate back to complete the retraction of the cable 11.

Figure 11:
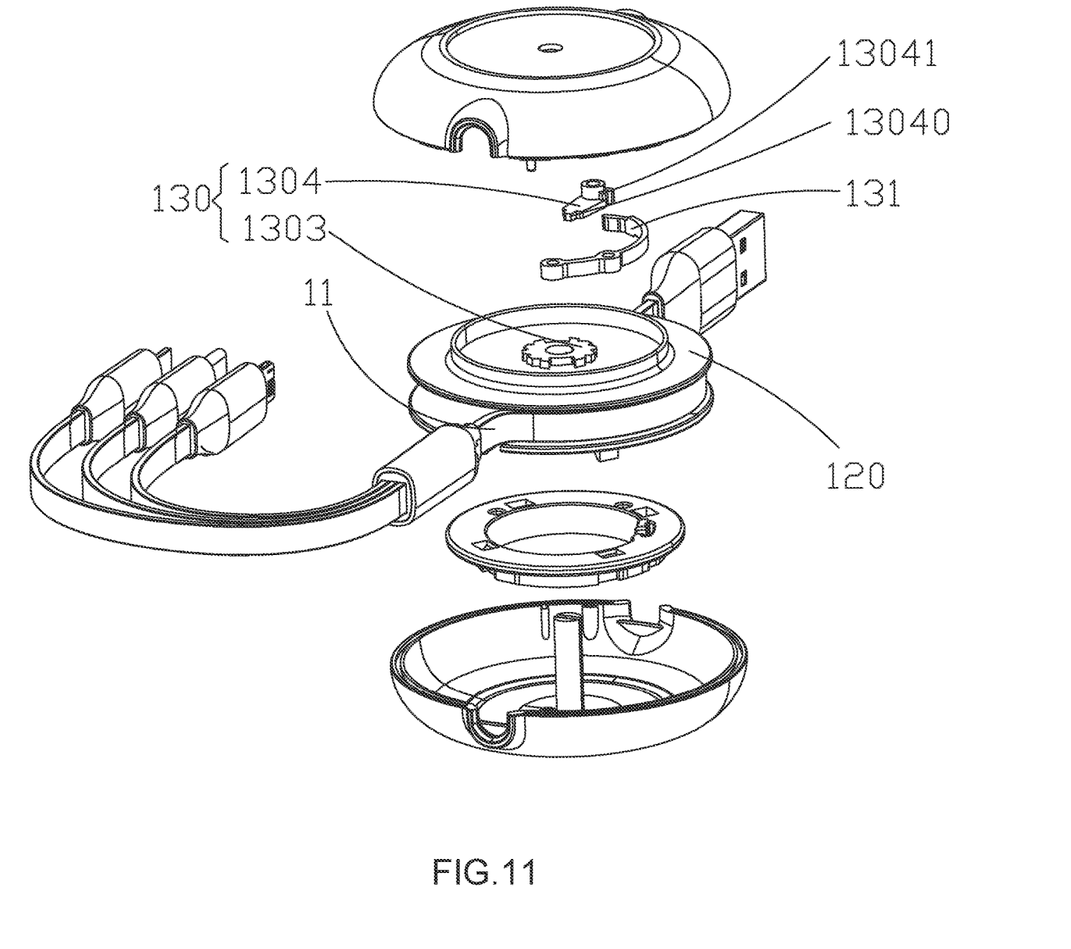
FIG. 11 is a second exploded view of the retractable data cable according to the first embodiment of the present disclosure.
Figure 12:
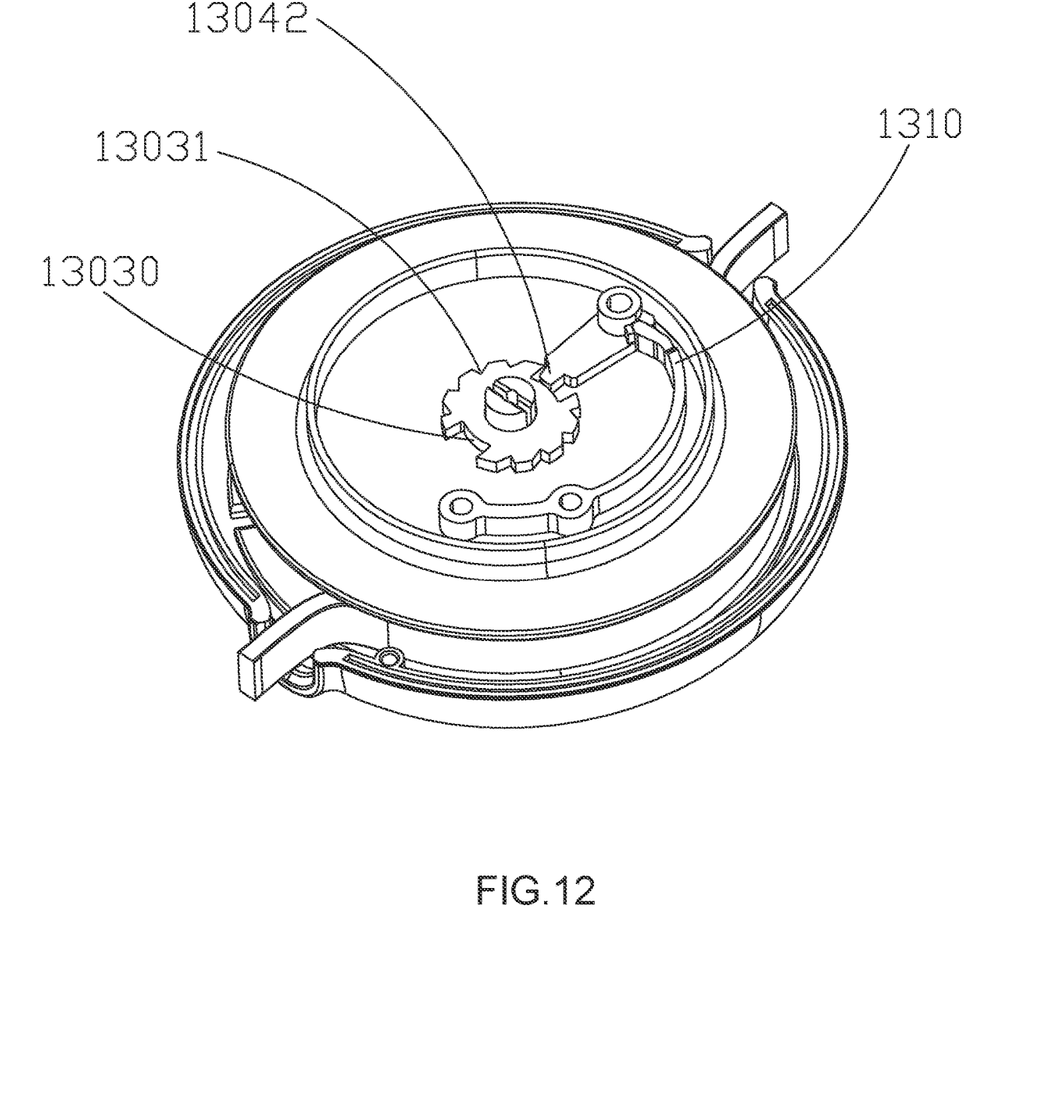
FIG. 12 is a second schematic diagram of the position distribution of components on the winder of the retractable data cable according to the first embodiment of the present disclosure.

Referring to FIG. 11 and FIG. 12, in some embodiments, the transmission assembly 130 includes a swing member 1304 and a shift-position gear 1303 fixedly connected to the winder 120. One end of the swing member 1304 is rotatably connected to the housing, and the other end thereof is provided with a fourth cooperating unit 13040 coupled with the shift-position gear 1303. The swing member 1304 is disposed between the shift-position gear 1303 and the auxiliary member 131. The swing member 1304 further includes a fifth cooperating unit 13041 coupled with the auxiliary member 131 to provide the swing member 1304 with a preload force for swinging toward or away from the side of the auxiliary member 131.

Preferably, the auxiliary member 131 is a strip-shaped reset member 1310, and the fourth cooperating unit 13040 is a tooth-shaped protrusion 13042 disposed on the other end of the swing member 1304.

In some embodiments, the shift-position gear 1303 includes a neutral-position tooth slot 13030 and a position-limiting tooth slot 13031, and the fourth cooperating unit 13040 is coupled with the neutral-position tooth slot 13030 and the position-limiting tooth slot 13031 to realize the retraction and locking of the cable 11.

Optionally, the number of the neutral-position tooth slots 13030 is 1-4, and the number of the position-limiting tooth slots 13031 is 4-8.

Preferably, the number of the neutral-position tooth slots 13030 is 2, the number of the position-limiting tooth slots 13031 is 8, and the neutral-position tooth slots 13030 and the position-limiting tooth slots 13031 are symmetrically arranged on the shift-position gear 1303. It should be understood that the number and arrangement positions of the neutral-position tooth slots 13030 and the position-limiting tooth slots 13031 may also be other manners, as long as the locking and retraction of the cable 11 can be realized.

It can be understood that the shift-position gear 1303 will have a multi-position cycle effect during use, namely, when stretching the cable 11, whenever a large position is stretched (the swing member 1304 moves from one neutral-position tooth slot 13030 to the next neutral-position tooth slot 13030), there will be four small positions in the large position for fine-tuning (4 position-limiting tooth slots 13031), which not only facilitates the adjustment of the length of the cable 11, but also enhances user experience.

It can be understood that when stretched, the cable 11 will drive the winder 120 and the shift-position gear 1303 to rotate, while the shift-position gear 1303 will drive one end of the swing member 1304 to move in the direction opposite to the direction of the preload force provided by the auxiliary member 131. When moving for a period of time, the swing member 1304 will disengage from the tooth slot of the shift-position gear 1303 to rebound, and couple with the adjacent tooth slot. The adjacent tooth slot will continue to drive the swing member 1304 to swing in the direction opposite to the direction of the preload force.

When the stretching stops, if the tooth-shaped protrusion 13042 is matched with the position-limiting tooth slot 13031 at this time, the shift-position gear 1303 will be locked by the swing member 1304 after a short rotation, namely, the cable 11 will be locked by the swing member 1304 after being retracted for a short distance to keep the cable 11 in a stretched state. When the stretching stops, if the cable 11 is not locked after retracting a short distance, the tooth-shaped protrusion 13042 is matched with the neutral-position tooth slot 13030 at this time. To realize the locking of the cable 11, it is only necessary to continue to stretch the cable 11 to make the tooth-shaped protrusion 13042 match with the position-limiting tooth slot 13031.

When the cable 11 in the stretched state needs to be retracted, continue to stretch the cable 11 until the tooth-shaped protrusion 13042 is matched with the neutral-position tooth slots 13030. Then release the cable 11, the winder 120 and the shift-position gear 1303 rotate back, and the neutral-position tooth slot 13030 will drive the swing member 1304 to swing in the direction of the preload force through the tooth-shaped protrusion 13042, which makes the tooth-shaped protrusion 13042 no longer match with the position-limiting tooth slot 13031 when the shift-position gear 1303 rotates back, so that the swing member 1304 no longer hinders the rotation of the winder 120, namely, the swing member 1304 no longer hinders the retraction of the cable 11.

Compared with the prior art, the retractable data cable of the present disclosure has the following beneficial effects.

The present disclosure provides a retractable data cable, which includes a hollow housing, a cable, a winding assembly and a movable assembly. The housing defines an accommodating cavity, and the winding assembly and the movable assembly are arranged therein. The cable is wound around the winding assembly and exposed out of the housing. The winding assembly includes a winder, which is rotatable with respect to the housing. The movable assembly is disposed on a side of the winder and relatively fixed to the housing. The movable assembly includes a transmission assembly coupled with the housing and the winder and an auxiliary member fixedly connected to the housing. The transmission assembly is coupled with the winder, and the auxiliary member is disposed on one side of the transmission assembly and coupled with the transmission assembly. The winder rotates to drive the transmission assembly to move and then drive the auxiliary member to produce elastic deformation, so as to provide the transmission assembly with a preload force for swinging toward or away from the side of the auxiliary member. By arranging the winder, the cable wound on the winder can be freely stretched or retracted. In the retractable data cable, the winder is coupled with the movable assembly, so that the movable assembly can position the cable no matter how long the cable wound on the winder is stretched. When using, pull the cable to drive the winder to rotate, so that the cable can be pulled out from the winder. When pulling out a suitable length to use, the cable can be released directly, and the winder is coupled with the transmission assembly and the auxiliary member of the movable assembly to keep the cable at this length for use. It can be seen that the movable assembly is coupled with the winder, so that the adjusting structure of the retractable data cable is simplified, and the practicability thereof is effectively improved.

The transmission assembly of the retractable data cable of the present disclosure includes a moving gear, a position-limiting gear and a swing reset member. The moving gear is fixedly connected to the winder, and the swing reset member is positioned between the moving gear, the position-limiting gear and the auxiliary member. The swing reset member includes a first cooperating unit coupled with the position-limiting gear, a second cooperating unit coupled with the moving gear, and a third cooperating unit coupled with the auxiliary member. The auxiliary member is coupled with the third cooperating unit to provide a preload force for the swing reset member to swing toward or away from the side of the auxiliary member. Through the elastic deformation of the auxiliary member, the third cooperating unit applies a preload force to the swing reset member, so that the swing reset member has a tendency to swing to one side. When the cable is pulled to drive the winder and the moving gear to rotate, the moving gear will drive the swing reset member to move through the second cooperating unit, so that the swing reset member drives the position-limiting gear to rotate through the first cooperating unit. However, due to the existence of the preload force, the swing reset member will rebound when moving to a certain distance, so as to be in contact to couple with the tooth slot of the position-limiting gear again. The swing reset member is coupled with different tooth slots of the position-limiting gear, so that the function of locking and retraction can be realized. It can be seen that, by providing the preload force provided by the auxiliary member to make the swing reset member rebound, the structure of the retractable data cable is simpler.

The auxiliary member of the retractable data cable of the present disclosure is a strip-shaped reset member that can perform elastic deformation. One end of the strip-shaped reset member is a fixed end fixedly connected to the housing, and the other end thereof is a free end coupled with the third cooperating unit. By being relatively fixed to the housing, it can be ensured that the strip-shaped reset member as a whole will remain relatively static during use, and a stable preload force is provided to the swing reset member. In addition, when the auxiliary member is configured as a strip-shaped reset member, the auxiliary member and the transmission assembly are arranged separately, so that when breaking down, it is easier to replace the damaged component.

In the retractable data cable of the present disclosure, one end of the strip-shaped reset member defines at least two slots or holes separately, and the housing is provided with a corresponding number of position-limiting shafts at corresponding positions. The position-limiting shafts are coupled with the slots or holes on the strip-shaped reset member to limit the position of the strip-shaped reset member. The at least two shafts are coupled with the holes to position the strip-shaped reset member, so that the strip-shaped reset member is coupled with the swing reset member more stably, the structure is simple, the installation is convenient, and the realization is easy.

In the retractable data cable of the present disclosure, the first cooperating unit includes a pushing portion and a locking portion, which are respectively arranged at two ends of the swing reset member to couple with the position-limiting gear. Thus, the swing reset member can drive the position-limiting gear and couple with the limit gear during the swing, so as to realize the locking of the position-limiting gear to the swing reset member in different states, which is simple in structure, small in size, and makes the data cable lighter.

In the retractable data cable of the present disclosure, the winding assembly further includes a coil spring disposed on the side of the winder away from the movable assembly and fixedly connected to the winder. The coil spring can store elastic potential energy when the cable is stretched, and the cable can be retracted via the stored elastic potential energy when not in use, which improves the retractable function of the data cable.

In the retractable data cable of the present disclosure, the winding assembly further includes a coil-spring fixing member. One end of the coil-spring fixing member is relatively fixed to the end of the winder close to the coil spring, and the other end thereof is clamped with one end of the coil spring. By disposing the coil-spring fixing member, the fixed connection between the coil spring and the winder is realized, which makes the installation more convenient and the structure more reasonable.

In the retractable data cable of the present disclosure, the moving gear includes at least three tooth slots, and the second cooperating unit is a protrusion matched with the tooth slots. By matching the tooth slots with the protrusion, the moving gear can drive the swing reset member to swing, and the swing reset member can slide out from the tooth slot when moving for a certain distance. The swing reset member can rebound via the preload force and at least three tooth slots can ensure that when the moving gear rotates, the swing reset member will not be in a static state for a long time without matching with the tooth slots, which prevents the situation that the cable cannot be locked timely. It can be seen that, by matching the protrusion with the tooth slots, the structure of the retractable data cable is more reasonable, and the use is smoother.

In the retractable data cable of the present disclosure, an annular isolation wall is further provided on the side of the winder close to the movable assembly. The annular isolation wall and the housing define an isolation cavity, and the movable assembly is disposed therein. The movable assembly is isolated by the isolation cavity, which protects the movable assembly and prolongs the lifetime of the retractable data cable.

The foregoing descriptions are only preferred embodiments of the present disclosure, and should not be construed as limiting the scope of the disclosure. Any modifications, equivalent replacements and improvements made within the principles of the present disclosure should be included within the protection scope of the present disclosure.

The invention claimed is:

1. A retractable data cable assembly, comprising a hollow housing, a cable, a winding assembly and a movable assembly; the housing defining an accommodating cavity, and the winding assembly and the movable assembly being arranged therein; the cable being wound around the winding assembly and exposed out of the housing;

the winding assembly comprising a winder, which is rotatable with respect to the housing; the movable assembly being disposed on a side of the winder and relatively fixed to the housing;

the movable assembly comprising a transmission assembly coupled with the housing and the winder and an auxiliary member fixed to the housing; the movable assembly comprising a swing reset member; the auxiliary member being disposed on one side of the transmission assembly and coupled with the transmission assembly; the winder rotating to drive the transmission assembly to move and then driving the auxiliary member to produce elastic deformation, so as to provide the swing reset member with a preload force for swinging toward or away from one side of the auxiliary member;

the auxiliary member being a strip-shaped reset member that can perform elastic deformation; the fixed end of the strip-shaped reset member defining at least two spaced slots or holes, and the housing being provided with a corresponding number of position-limiting shafts at corresponding positions; the position-limiting shafts being coupled with the slots or holes on the strip-shaped reset member to limit the position of the strip-shaped reset member.

2. The retractable data cable assembly according to claim 1, wherein the transmission assembly further comprises a moving gear ad a position-limiting gear; the moving gear being fixedly connected to the winder;

the swing reset member being positioned among the moving gear, the position-limiting gear and the auxiliary member; the swing reset member comprises a first cooperating unit coupled with the position-limiting gear, a second cooperating unit coupled with the moving gear, and a third cooperating unit coupled with the auxiliary member; the auxiliary member being coupled with the third cooperating unit to provide a preload force for the swing reset member to swing toward or away from one side of the auxiliary member.

3. The retractable data cable assembly according to claim 2, wherein one end of the strip-shaped reset member being fixed to the housing, and the other end thereof being coupled with the third cooperating unit.

4. The retractable data cable assembly according to claim 3, wherein the first cooperating unit comprises a pushing portion and a locking portion, which are respectively arranged at two ends of the swing reset member to couple with the position-limiting gear.

5. The retractable data cable assembly according to claim 3, wherein the winding assembly further comprises a coil spring disposed on a side of the winder away from the movable assembly and fixed to the winder.

6. The retractable data cable assembly according to claim 5, wherein the winding assembly further comprises a coil-spring fixing member; one end of the coil-spring fixing member being relatively fixed to a end of the winder close to the coil spring, and the other end thereof being clamped with one end of the coil spring.

7. The retractable data cable assembly according to claim 2, wherein the moving gear comprises at least three tooth slots, and the second cooperating unit being a protrusion matched with the tooth slots.

8. The retractable data cable assembly according to claim 1, wherein an annular isolation wall is further provided on a side of the winder close to the movable assembly; the annular isolation wall and the housing defining an isolation cavity, and the movable assembly being disposed therein.

9. The retractable data cable assembly according to claim 3, wherein a central shaft is provided on the housing, the moving gear and the winder being sleeved on the central shaft, and the strip-shaped reset member being arranged around the central shaft.

10. The retractable data cable assembly according to claim 2, wherein the transmission assembly comprises a swing member and a shift-position gear; the shift-position gear being fixed to the winder, one end of the swing member being rotatably connected to the housing;

the swing member being disposed between the shift-position gear and the auxiliary member; the other end of the swing member being provided with a fourth cooperating unit coupled with the shift-position gear; the swing member further comprising a fifth cooperating unit coupled with the auxiliary member to provide the swing member with the preload force for swinging toward or away from the side of the auxiliary member.

11. The retractable data cable assembly according to claim 10, wherein the shift-position gear comprises a neutral-position tooth slot and a position-limiting tooth slot, and the fourth cooperating unit being coupled with the neutral-position tooth slot and the position-limiting tooth slot to realize the retraction and locking of the cable.

12. The retractable data cable assembly according to claim 2, wherein a locking tooth slot and a reset tooth slot are alternately arranged on the position-limiting gear; the first cooperating unit comprising a pushing portion and a locking portion, which are respectively arranged on two ends of the swing reset member to couple with the locking tooth slot and the reset tooth slot of the position-limiting gear.

13. The retractable data cable assembly according to claim 2, wherein the third cooperating unit is a groove, and the depth of the groove can ensure that the swing reset member does not slip out of the groove when the swing reset member swings.

14. The retractable data cable assembly according to claim 2, wherein a first positioning shaft and a second positioning shaft are arranged in the housing; the position-limiting gear being rotatably connected to the housing through the first positioning shaft, and the swing reset member being rotatably connected to the housing through the second positioning shaft.

15. The retractable data cable assembly according to claim 3, wherein the strip-shaped reset member is configured in an arc shape.

16. The retractable data cable assembly according to claim 2, wherein the cable comprises an input connector and an output connector, and the number of the input connector and the output connector can be one, two or three.

17. The retractable data cable assembly according to claim 10, wherein the fourth cooperating unit is a tooth-shaped protrusion disposed on the other end of the swing member.

18. The retractable data cable assembly according to claim 10, wherein the number of the neutral-position tooth slots is 1 to 4, and the number of the position-limiting tooth slots is 4 to 8.

19. The retractable data cable assembly according to claim 10, wherein the neutral-position tooth slot and the position-limiting tooth slot are symmetrically arranged on the shift-position gear.

\* \* \* \* \*